(12) United States Patent
Momose et al.

(10) Patent No.: US 10,697,925 B2
(45) Date of Patent: Jun. 30, 2020

(54) GAS SENSOR DEVICE, GAS MEASURING EQUIPMENT, AND METHOD FOR FABRICATING GAS SENSOR DEVICE

(71) Applicant: FUJITSU LIMITED, Kawasaki-shi, Kanagawa (JP)

(72) Inventors: Satoru Momose, Atsugi (JP); Michio Ushigome, Atsugi (JP); Osamu Tsuboi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 44 days.

(21) Appl. No.: 15/668,422

(22) Filed: Aug. 3, 2017

(65) Prior Publication Data
US 2018/0038822 A1    Feb. 8, 2018

(30) Foreign Application Priority Data
Aug. 8, 2016    (JP) .................... 2016-155902

(51) Int. Cl.
*G01N 27/407*    (2006.01)
*C01G 3/02*    (2006.01)
*C01G 3/04*    (2006.01)

(52) U.S. Cl.
CPC ........... *G01N 27/4075* (2013.01); *C01G 3/02* (2013.01); *C01G 3/04* (2013.01)

(58) Field of Classification Search
CPC .... A61B 5/082; G01N 27/04; G01N 27/4075; G01N 33/497; C01G 3/02; C01G 3/04
See application file for complete search history.

(56) References Cited

U.S. PATENT DOCUMENTS

2003/0037593 A1 * 2/2003 Hattori .................. G01N 27/12
   73/31.06
2013/0125617 A1 * 5/2013 Gouma ................ G01N 27/122
   73/23.3

FOREIGN PATENT DOCUMENTS

| JP | S51-115895 A | 10/1976 |
| JP | 2004-325388 A | 11/2004 |
| JP | 2005-164554 A | 6/2005 |
| JP | 2007-248352 | 9/2007 |

OTHER PUBLICATIONS

Pascal Lauque, Marc Bendahan, Jean-Luc Seguin, Kieu An Ngo, Philippe Knauth, Highly sensitive and selective room temperature NH3 gas microsensor using an ionic conductor (CuBr) film, Analytica Chimica Acta, vol. 515, Issue 2, Jul. 12, 2004, pp. 279-284. (Year: 2004).*

Pascal Lauque et al., "Highly Sensitive and Selective Room Temperature NH3 Gas Microsensor Using an Ionic Conductor (CuBr) film", Analytica Chimica Acta, vol. 515, pp. 279-284 (2004) (Total: 6pages).

JPOA—Office Action dated Mar. 31, 2020 issued with respect to the basic Japanese Patent Application No. 2016-155902, with full machine translation.

* cited by examiner

*Primary Examiner* — Mayla Gonzalez Ramos
(74) *Attorney, Agent, or Firm* — Fujitsu Patent Center (57) ABSTRACT

A gas sensor device has a crystalline film of copper(I) bromide, wherein a crystal surface of the copper(I) bromide is formed of a stepped terrace having a flat face and a steep slope.

12 Claims, 10 Drawing Sheets

| | RELATIVE SENSITIVITY (%) | |
|---|---|---|
| | EMBODIMENT | COMPARATIVE EXAMPLE |
| AMMONIA | 100 | 100 |
| HYDROGEN SULFIDE | 5.0 | 9.3 |
| ETHANOL | 0.04 | 0.01 |
| ACETALDEHYDE | 0.02 | 0.01 |
| ACETONE | 0.00 | 0.00 |

GAS SENSOR DEVICE, GAS MEASURING EQUIPMENT, AND METHOD FOR FABRICATING GAS SENSOR DEVICE

CROSS-REFERENCE TO RELATED APPLICATIONS

This application is based upon and claims the benefit of priority of the prior Japanese Patent Application No. 2016-155902 filed Aug. 8, 2016, which is incorporated herein by reference in its entirety.

FIELD

The present invention relates to a gas sensor device, a gas measuring equipment, and a method for fabricating a gas sensor device.

BACKGROUND

The mainstream technology in the field of gas sensors is to use a metal oxide semiconductor typified by tin dioxide ($SnO_2$) as a gas detector and measure a change in electric resistance due to adsorption of chemical substances onto the surface of the metal oxide semiconductor material. To perform high-sensitive gas measurement under such configuration, electric current is supplied from a constant current source, while heating the gas sensor device up to a temperature suitable to achieving satisfactory detection characteristics. The power consumption of the detecting circuit thus tends to be high, and especially a large quantity of electric power is consumed by a heater for heating the gas sensor device.

There are some materials that can be, used for a resistive-type gas sensor operative at room temperature. Copper(I) bromide (with the formula CuBr, which is also called cuprous bromide), one of copper halides, is a typical example. A device using CuBr as a gas detector and exhibiting a significant change in electric resistance at room temperature, in the presence of ammonia in the air is proposed. See, for example, Analytica Chimica Acta, Vol. 515, PP. 279 (2004).

CuBr has excellent, characteristics in sensitivity and selectivity to ammonia. However, time for attaining the equilibrium representing the ammonia concentration from the initial state is as long as ten minutes, which means that it takes time for a sensor to respond to the change in resistance.

A technique or structure for maximizing the response speed of a gas sensor device using CuBr is desired.

SUMMARY

According to an aspect of the invention, a gas sensor device has a crystalline film of copper(I) bromide, wherein a crystal surface of the copper(I) bromide is formed of a stepped terrace having a flat face and a steep slope.

The object and advantages of the invention will be realized and attained, by means of the elements and combinations particularly pointed out in the claims. It is to be understood that both the foregoing general description and the following detailed description are exemplary and explanatory and are not restrictive to the invention as claimed.

DESCRIPTION OF EMBODIMENTS

In the following embodiments, the response speed of a gas sensor device is optimized by realizing a configuration in which a specific crystal plane becomes dominant on the surface of CuBr which is a sensor material for sensing a chemical substance in the air. The basic concept is based upon novel knowledge described below.

With a semiconductor gas sensor operating at room temperature, the adsorption phenomenon of the target gas occurring on the sensor surface is one of the factors that determine the response characteristic of the device. The amount of gas molecules adsorbed on the surface of the sensor surface per unit area is described using the Langmuir model, for example. The adsorption amount per unit surface area corresponds to a change in electric resistance in the sensor.

Figure 1:
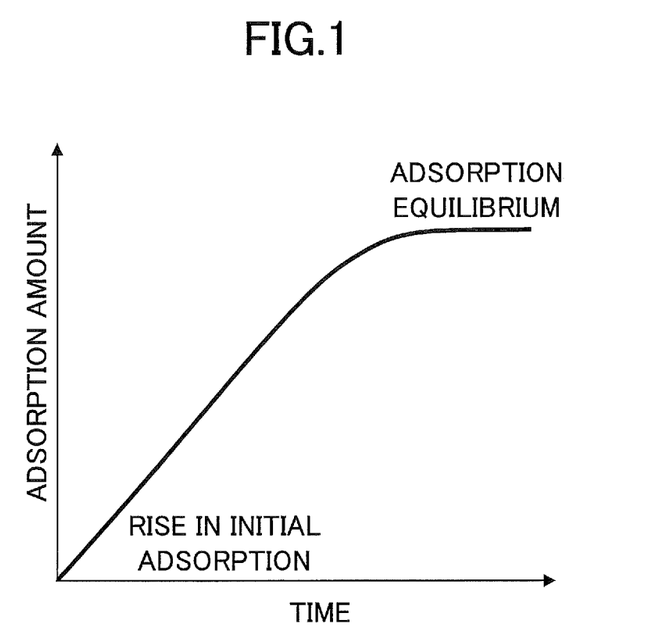
FIG. 1 illustrates an ideal adsorption model of gas molecules adsorbed onto a solid surface.

FIG. 1 illustrates an ideal adsorption model of gas molecules adsorbed onto a solid surface. In the initial (or rising) stage of adsorption, the amount of gas molecules adsorbed increases with time. When the amount of adsorption reaches a certain level, the surface is saturated and adsorption equilibrium is reached. The equilibrium concentration of the adsorbed gas correlates, with the concentration of the target gas in the air. The equilibrium concentration at the surface of the sensor material also determines the response strength of the gas sensor for the gas concentration in the air. The rate of adsorption of the target gas molecules at the surface of the sensing material determines the rising rate of the response of the device.

Figure 2:
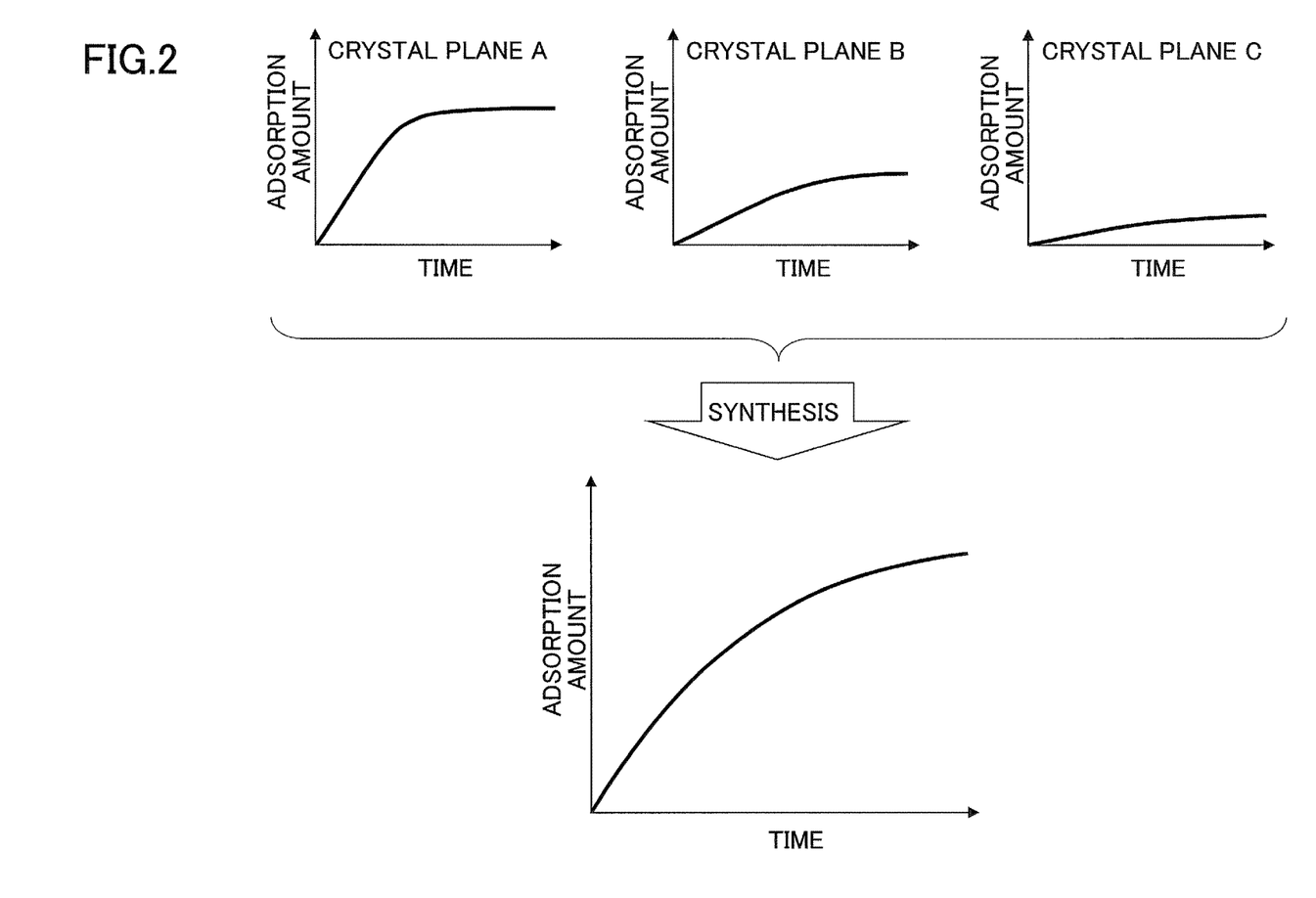
FIG. 2 illustrates a response characteristic of a sensor leveling off when an interface has crystal planes with different adsorption characteristics.

As illustrated in FIG. 2, in actuality, the adsorption rate and the equilibrium concentration vary depending on orientations of crystal planes constituting the interface with the air. In the example of FIG. 2, the adsorption characteristics are different among the crystal planes A, B and C exposed to the air. The response characteristic of the sensor device as a whole is represented by the total of the characteristics of the respective crystal planes. The change with time in resistance includes variations in adsorption rate due to the difference in orientation of crystal planes. When the variation is large, the time required for the resistance value to reach the equilibrium depends on the crystal plane with the lowest adsorption rate. Therefore, the rising response of the sensor becomes slow for the entirety of the device.

If the interface between the sensor material and the air can be formed with a crystal plane with a specific orientation in which the adsorption rate for a target gas is fast, time taken for the gas sensor to reach the equilibrium resistance can be minimized. In other words, the response speed of the device can be maximised by configuring the device such that a crystal plane with a high adsorption rate for the target gas becomes dominant at the interface with the air.

Figure 3A:
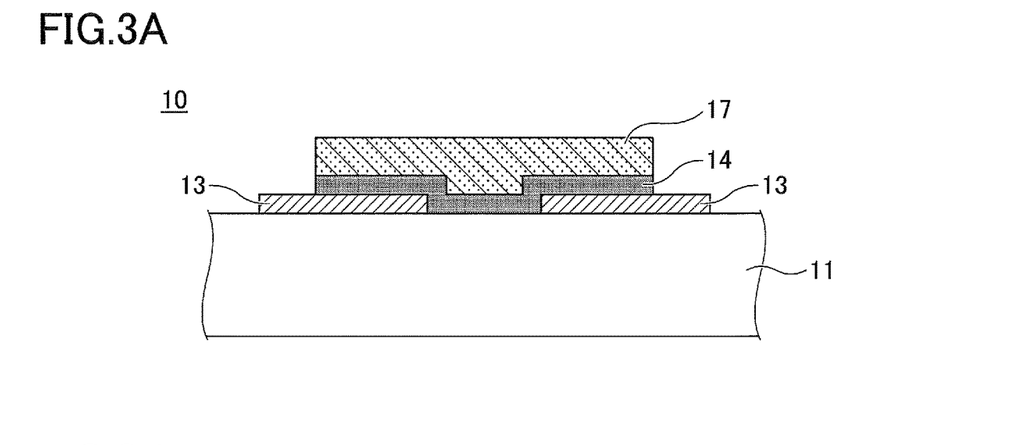
FIG. 3A is a cross-sectional view of a gas sensor device according to an embodiment.
Figure 3B:
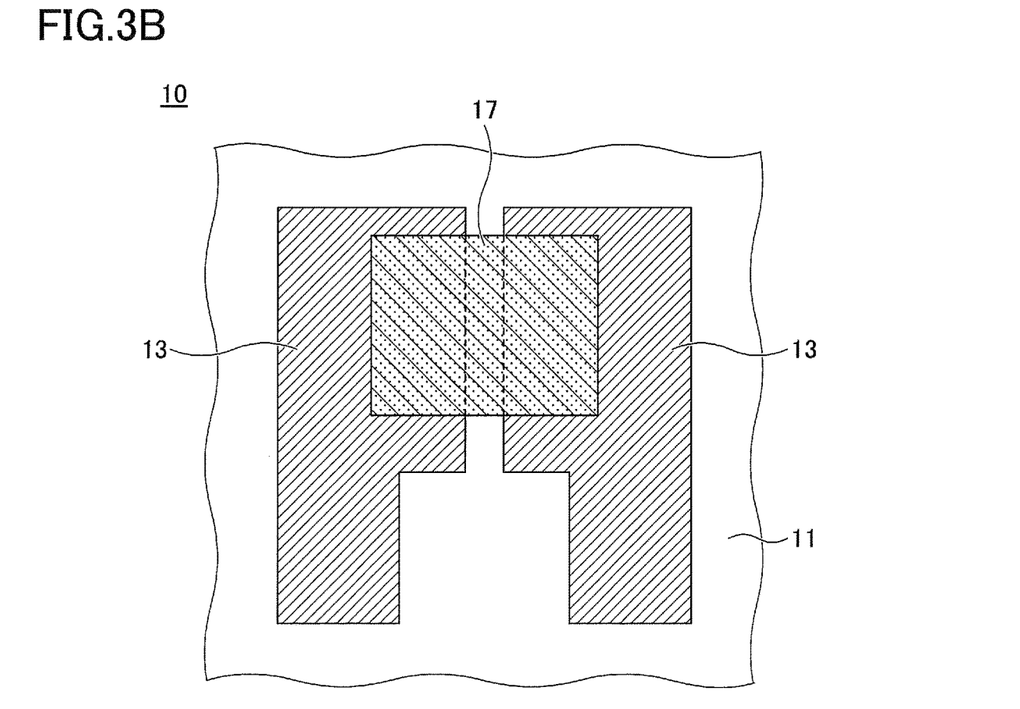
FIG. 3B is a plan view of the gas sensor device according to the embodiment.

FIG. 3A and FIG. 3B schematically illustrate a gas sensor device 10 according to an embodiment in a cross-sectional view and a plan view, respectively. The gas sensor device 10 is a resistive gas sensor using CuBr as a sensing material whose electrical resistance changes as a function of the surrounding ambient gas. CuBr is a solid electrolyte and has properties as a p-type semiconductor. A sensing film 17 containing CuBr as a major component is disposed across a pair of electrode films 13 formed on the insulating substrate 11. A layer 14 containing copper oxide is inserted between the sensing film 17 and the insulating substrate 11 and/or between the sensing film 17 and the electrode films 13.

One of the features of the embodiment is that the crystal surface of the sensing film 17 at the interface with the air is formed into a stepped terrace in which a flat face and a steep slope are combined. In the crystal surface that forms the stepped terrace, the (111) plane is dominant. The structure of the stepped terrace will be described below in more detail.

The layer 14 containing copper oxide is derived through an underlying layer, and is provided to make the crystal surface of the sensing film 17 primarily (111) oriented. By making the crystal surface of the sensing film 17 the (111) dominant surface, the stepped terrace with flat faces is developed and the response speed and the selectivity to the target gas can be optimized.

Figure 4A:
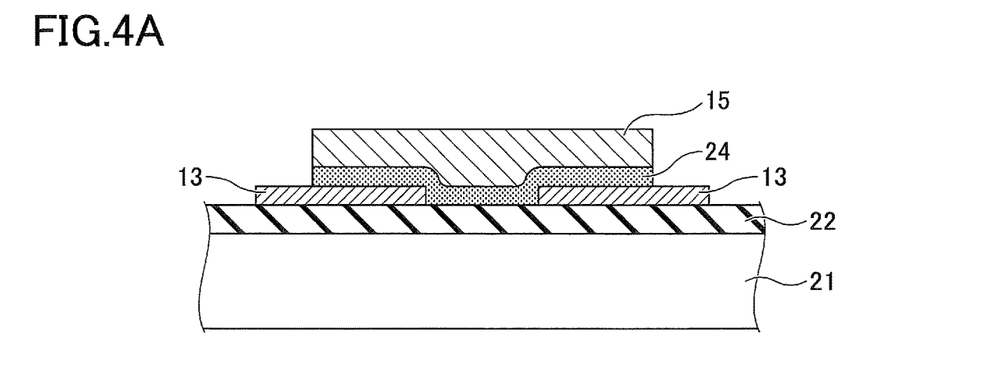
FIG. 4A illustrates a fabrication process of a gas sensor device according to an embodiment.
Figure 4B:
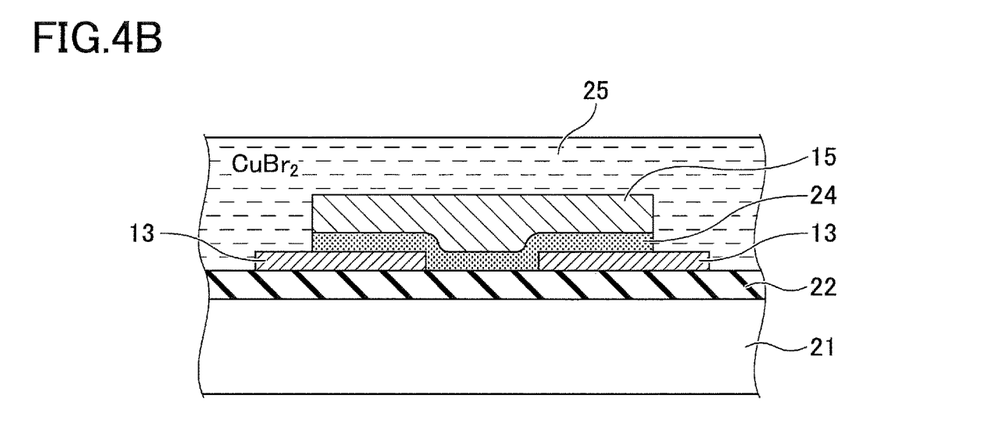
FIG. 4B illustrates a fabrication process of a gas sensor device according to an embodiment.
Figure 4C:
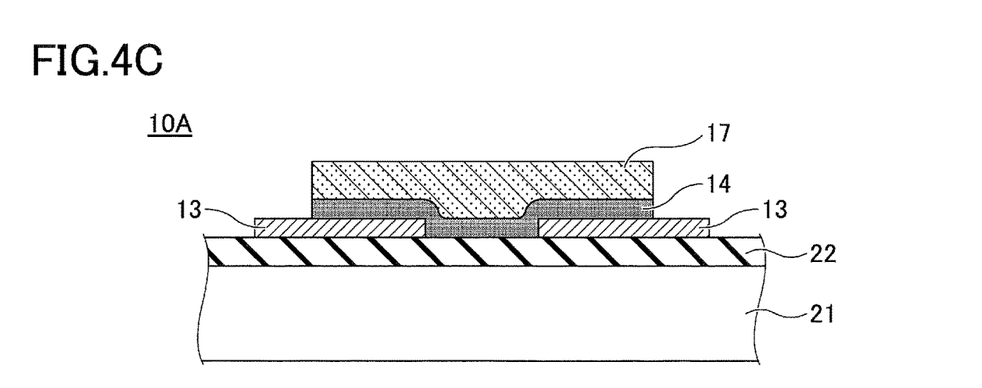
FIG. 4C illustrates a fabrication process of a gas sensor device according to an embodiment.

FIG. 4A through FIG. 4C illustrate a fabrication process of a gas sensor device 10A with a sensing film 17. In FIG. 4A, a pair of electrode films 13 are formed of a noble metal such as gold (Au), platinum (Pt) or the like, at a predetermined position on a silicon oxide layer 22 provided over a silicon substrate 21. An underlying layer 24 of copper(I) oxide (with the formula $Cu_2O$, which is also called cuprous oxide) is formed so as to overlap the pair of electrode films 13, and then a copper (Cu) film 15 is formed over the $Cu_2O$ underlying layer 24 to form the structure of FIG. 4A. The $Cu_2O$ underlying layer 24 is formed by exposing a thin film of copper to the air for oxidisation.

In FIG. 4B, the structure obtained in FIG. 4A is immersed into a solution 25 of copper(II) bromide (with the formula $CuBr_2$, which is also called cupric bromide) and then rinsed with methanol. Through this process, a sensing film 17 of CuBr is produced from the Cu film 15. A part of the $Cu_2O$ underlying layer 24 reacts with $CuBr_2$ and copper(II) oxide (with the formula CuO, which is also called cupric oxide) is produced. The $Cu_2O$ underlying layer 24 eventually turns into a layer 14 containing copper oxide, as illustrated in FIG. 4C.

Figure 5:
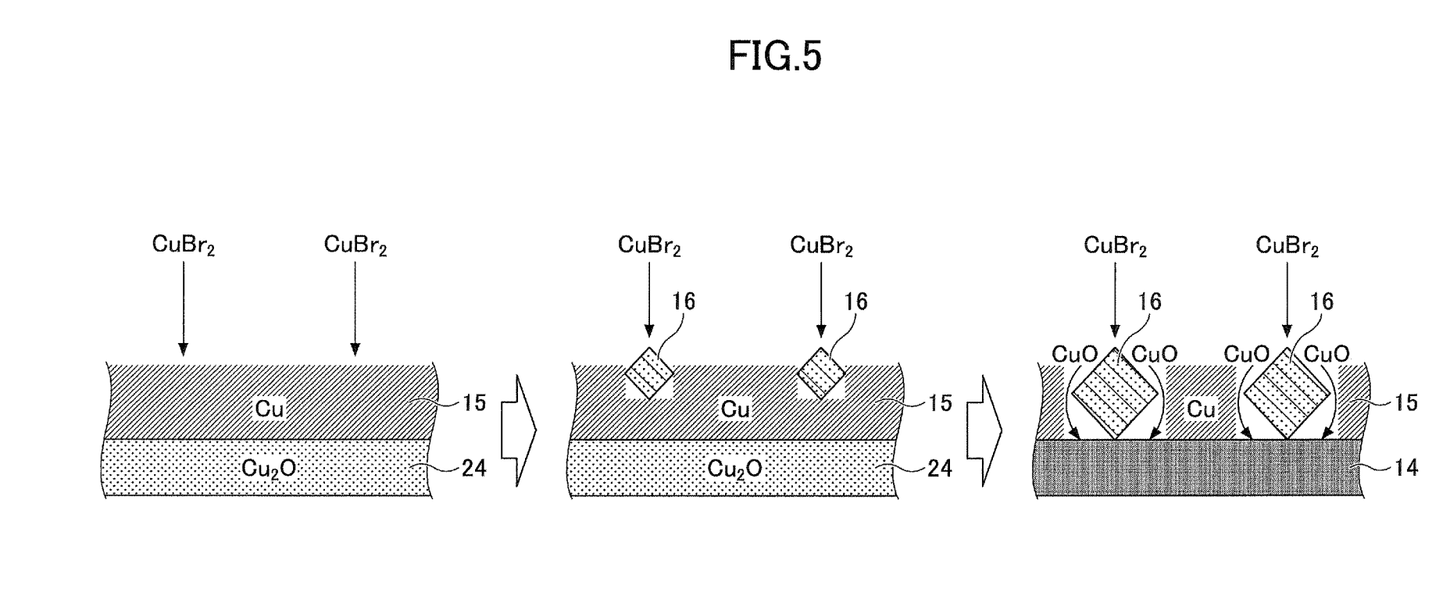
FIG. 5 illustrates a growth of CuBr crystal when supplying a copper(II) bromide ($CuBr_2$) solution onto a copper (Cu) film formed on an underlying layer of copper(I) oxide ($Cu_2O$)
Figure 6:
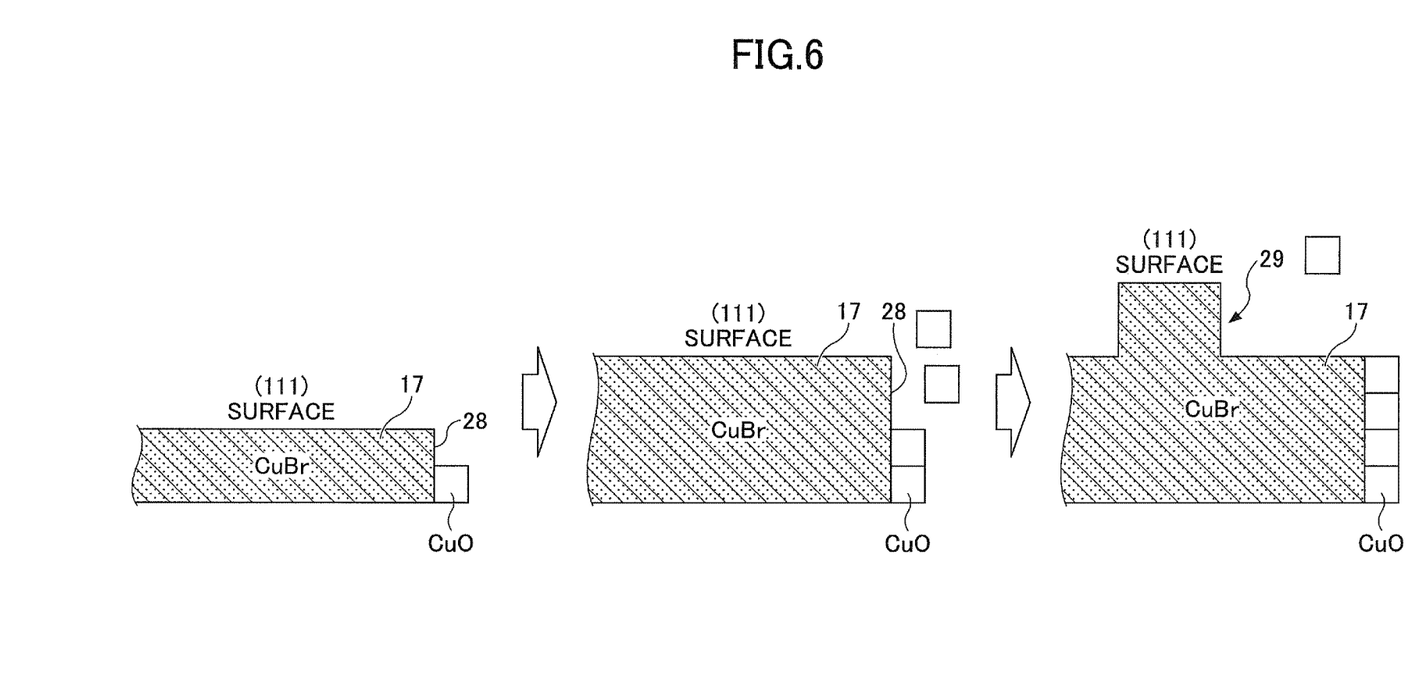
FIG. 6 is a schematic diagram for explaining dominant growth on the (111) plane of CuBr and a mechanism of formation of a stepped terrace.

FIG. 5 is a schematic diagram illustrating the process proceeding from FIG. 4B to FIG. 4C. When the Cu film 15 formed over the $Cu_2O$ underlying layer 24 is immersed in the $CuBr_2$ solution 25, $CuBr_2$ reacts with Cu at the surface of the Cu film 15, and a reaction product of CuBr crystal 16 grows as illustrated from the left-hand side to the middle of FIG. 5. The reaction is expressed by the formula At the right-hand side of FIG. 5, when the growth of the CuBr crystal 16 reaches the bottom of the Cu film 15, $Cu_2O$ of the underlying layer 24 reacts with $CuBr_2$ and CuO is produced. With the progress of the chemical reaction, the underlying layer 24 of $Cu_2O$ turns into a mixture layer of copper oxide, which chemical reaction is expressed by the formula FIG. 6 is a schematic diagram illustrating a formation of the stepped terrace in the CuBr sensing film 17. When CuO is released near a CuBr crystal of the sensing film 17 during the growth of CuBr, fine particles of CuO adhere to the surface of CuBr. Because the lattice spacing of the (111) plane of CuBr is twice the lattice spacing of the (021) plane of CuO, fine CuO particles adhere primarily onto the surface 28 approximately perpendicular to the (111) plane of CuBr, as illustrated in the left-hand side of FIG. 6. Since the growth rate at the surface 28 to which the CuO particles adhere decreases, CuBr crystal grows preferentially in the direction perpendicular to the (111) plane, as illustrated in the middle of FIG. 6.

When a large quantity of CuO adheres to the surface 28 that is approximately perpendicular to the (111) plane of CuBr, it becomes difficult for CuBr crystal to grow at the surface 28, and accordingly, CuBr further grows from a new crystal growth point on the (111) plane in the direction perpendicular to the (111) plane, as illustrated at the right of FIG. 6. In this manner, crystal of CuBr whose top face is predominantly composed of (111) plane with an edge forming a steep cliff is generated, thereby producing: a stepped terrace structure. The stepped terrace structure is referred to simply as a "stepped terrace" 29.

By brominating the Cu film 15, under which the $Cu_2O$ under layer 24 is provided, using $Cu_2Br$ solution, the CuBr sensing film 17 in which the crystal surface at the interface with the air is restricted mainly to the (111) plane is obtained. The response speed can be maximized by minimizing the proportion of crystal faces whose ammonia adsorption rates are lower than that of the (111) plans. Because the crystal surface at the interface with the air is restricted mainly to the (111) plane, the response to various gas species is in accordance with, the characteristic of the (111) and selectivity to different gas species can fee improved.

PRACTICAL EXAMPLE

Two gold (Au) electrodes having a width of 6 mm, a length of 12 mm, and a film thickness of 60 nm are formed by vacuum evaporation over a 15 mm×15 mm silicon wafer with a thermal oxide film, with a space of 1 mm between the electrodes. The thickness of the thermal oxide, film is 300 nm. A cooper (Cu) filer: having a size of 5 mm×5 mm and a thickness of 3.5 nm is formed by vacuum evaporation using a mask so as to overlap the pair of gold electrodes. This structure is exposed to air at 250° C. for 3 minutes to let the Cu film change to $Cu_2O$. The acquired $Cu_2O$ becomes the underlying layer 24. Subsequently, a copper (Cu) film of 5 mm×5 mm with a thickness of 60 nm is formed over the $Cu_2O$ film using a mask.

The obtained structure is immersed in a 0.1 mol/L aqueous solution of CuBr for 1 minute and then rinsed with methanol, thereby fabricating a gas sensor device 10A with a CuBr sensing film 17. The gas sensor device 10A is placed in an air flow and the gas source is switched between clean air and air containing ammonia at a concentration of 1 ppm to evaluate the reaction on of the device to ammonia.

Figure 7:
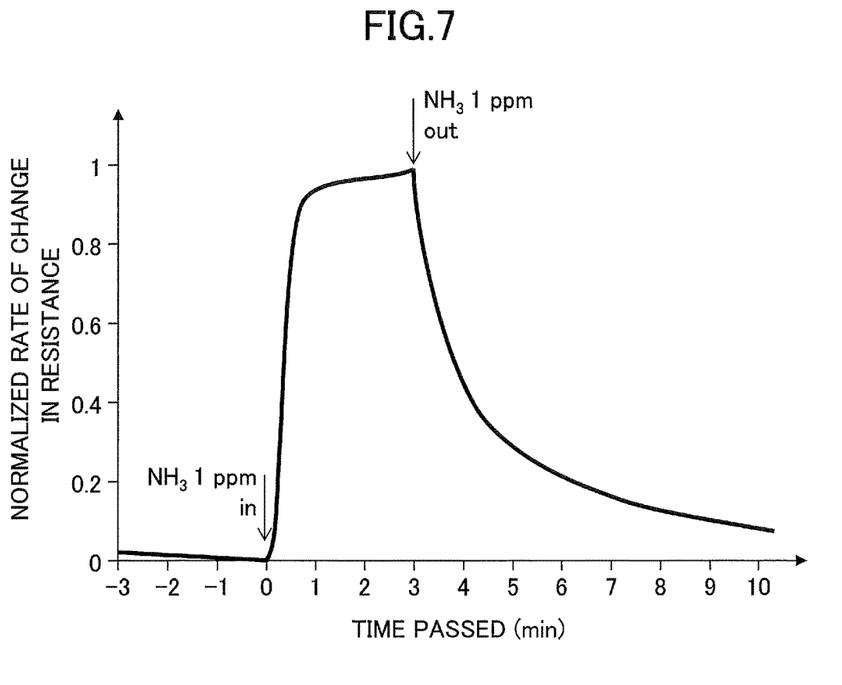
FIG. 7 illustrates a response characteristic of a gas sensor device according to an embodiment, indicating a change in resistance over time.

FIG. 7 is a graph illustrating the response of the gas sensor device 10A to ammonia, represented by rate of change in resistance as a function of time. After the air flow is switched from clean air to air containing 1-ppm ammonia, the resistance reaches 90% of the equilibrium in 40 seconds, and high speed response is achieved.

Figure 8:
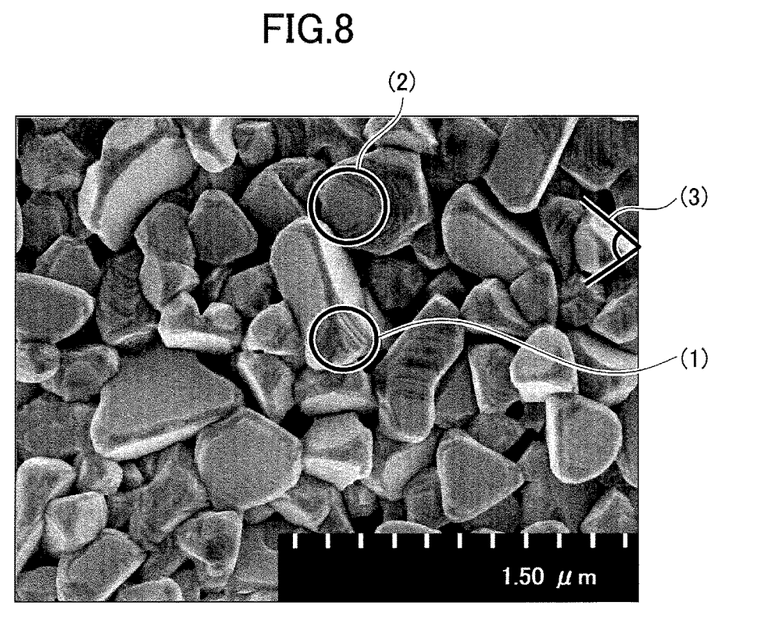
FIG. 8 is a SEM image of the surface of a CuBr sensing film formed by a fabrication method of an embodiment.

FIG. 8 is a scanning electron microscope (SEM) image of the CuBr sensing film 17 fabricated under the above-described conditions. This SEM image clearly shows that that the crystal surface of the CuBr is formed in a stepped terrace with flat faces (terrace planes) and steep slopes (terrace cliffs) formed at the edges of the flat faces, as indicated by circle (1). It is also seen from FIG. 8 that the basic shape of the flat face appearing at the top surface is an equilateral triangle as indicated by circle (2). This corresponds to the (111) plane of the cubic crystal system, in which crystal system copper(I) bromide is classified. Furthermore, the angle between two flat faces is approximately 71 degrees, which corresponds to the theoretical dihedral angle made by two (111) planes, as illustrated by angle (3). From these facts, the flat faces that, primarily form the fop surface of the CuBr crystalline film are (111)-oriented planes, of which the crystal orientation is the most stable in the cubic crystal system. The dimension across the fill) plane of the CuBr crystal ranges from 100 nm to 1000 nm.

Figure 9:
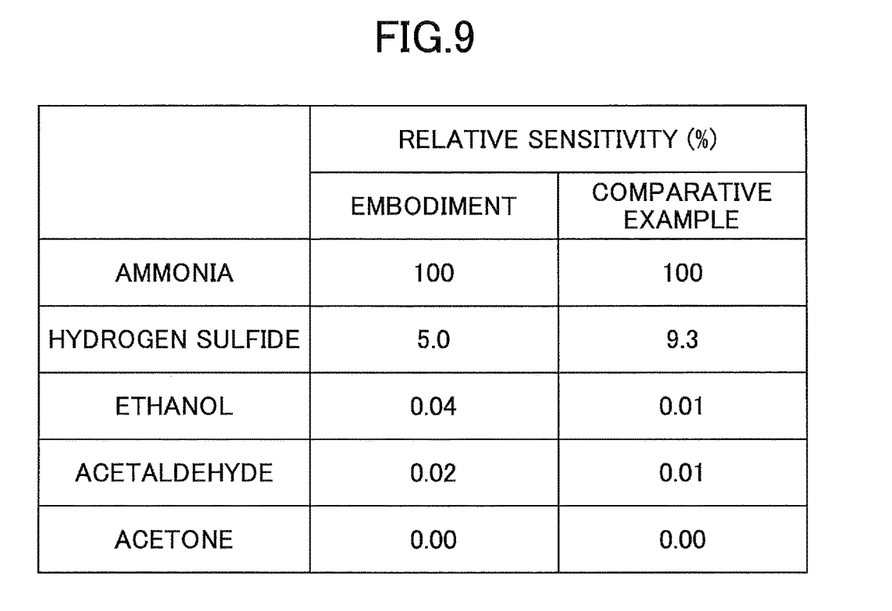
FIG. 9 is a diagram illustrating relative sensitivities or response strength of a gas sensor device with respect to various gases according to an embodiment, compared with a gas sensor device of a comparative example.

FIG. 9 illustrates relative sensitivities of the device to various gas species, where the sensitivity to ammonia is used as a reference of 100. The relative sensitivities of the gas sensor device 10A fabricated above are compared with those of a device of a comparative example, which will be described below. The response strength is indicated by the rate of change in electric resistance measured 3 minutes after the start of exposure to each gas.

For the gas sensor device 10A of the embodiment, the relative sensitivity to hydrogen sulfide, a gas of which is often mistaken for ammonia, is $1/20$ of the relative sensitivity to ammonia. The ratio $1/20$ does not mean exactly or strictly $1/20$, but includes errors and/or variations between fabricated films. With the device of the comparative example, the relative sensitivity to hydrogen sulfide is about $1/10$ of that to ammonia. This comparison result indicates that the gas sensor device 10A of the embodiment has superior gas selectivity.

By brominating the copper (Cu) film 15 that has the $Cu_2O$ underlying layer 24 beneath it, using $CuBr_2$ solution, the CuBr sensing film 17 whose crystal plan appearing at the interface is predominantly (111)-oriented is acquired (see FIG. 8). The sensing film 17 has high speed response (see FIG. 7) and exhibits excellent gas species selectivity as illustrated in FIG. 9.

COMPARATIVE EXAMPLE

Figure 10:
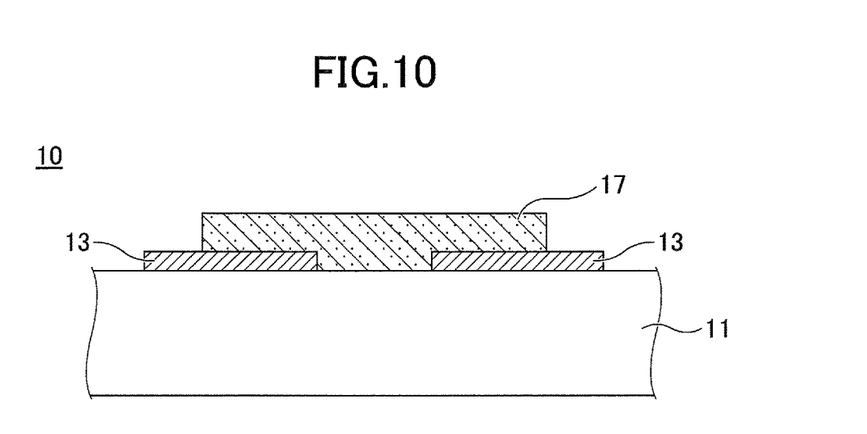
FIG. 10 is a diagram illustrating a gas sensor device of the comparative example.

FIG. 10 schematically illustrates a gas sensor device with a CuBr film fabricated without depositing the $Cu_2O$ underlying layer 24 beneath the CuBr film. Two gold (Au) electrodes having a width of 6 mm, a length of 12 mm, and a film thickness of 60 nm are formed by vacuum evaporation over a 15 mm×15 mm silicon wafer with a thermal oxide film, with a space of 1 mm between the electrodes. The thickness of the thermal oxide film is 100 nm. Up to this point, the process is the same as that in the actual embodiment.

A copper (Cu) film with a size of 5 mm×5 mm and a thickness of 60 nm is formed using a mask so as to overlap the pair of Au electrodes. The obtained structure is immersed in a 0.1 mol/L aqueous solution of $CuBr_2$ for 1 minute and then rinsed with methanol, whereby a or device with CuBr sensing film 107 is fabricated. This gas sensor device is placed in an air flow and the device is evaluated for its response to ammonia by switching the gas source between clean air and air containing ammonia at a concentration of 1 ppm.

Figure 11:
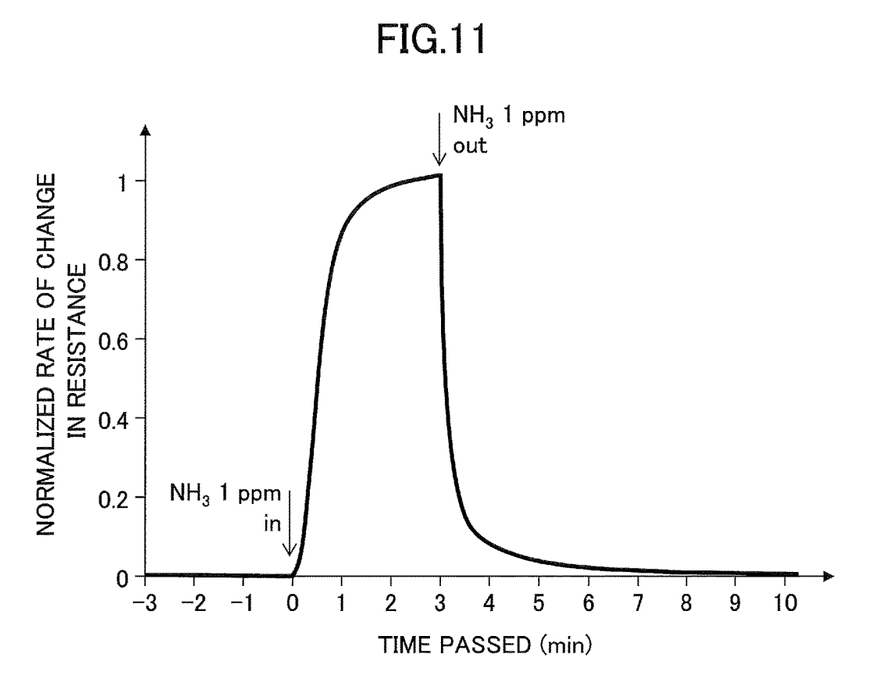
FIG. 11 illustrates a response characteristic of a gas sensor device of the comparative example, indicating a change in resistance over time.

FIG. 11 is a graph illustrating the response of the device of the comparative example with respect to ammonia, indicated by rate of change in electric resistance as a function of time. After switching the sir flow from clean air to air containing 1 ppm of ammonia, time to reach 90% of the equilibrium resistance value is 75 seconds. Compared to 40-second rising time of the gas sensor device 10A of the embodiment, approximately twice as much time is required for the comparative device. In other words, by employing the configuration of the embodiment, time to reach the equilibrium can be reduced to about half of that taken in the conventional structure. From the table of FIG. 9, the relative sensitivity of the comparative device to hydrogen sulfide is $1/10$ of ammonia. This selection ratio is insufficient for practical use to measure a specific gas species; thus the comparative device is unsatisfactory in gas selectivity, unlike the gas sensor device 10A of the embodiment.

Figure 12:
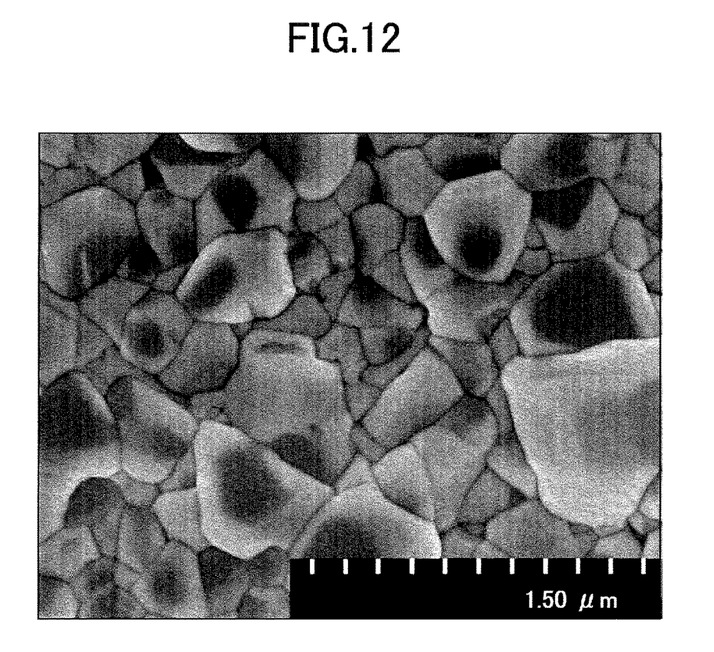
FIG. 12 is a SEM image of the surface of a CuBr sensing film of the gas sensor device of the comparative example.

FIG. 12 is a SEM image of the CuBr sensing film 107 formed under the conditions of the comparative example. As is seen from the SEM image, the crystal planes are joined smoothly to each other on the surface of the CuBr crystalline film. There is no suggestion of a specific crystal plane with particular orientation being formed preferentially.

Figure 13:
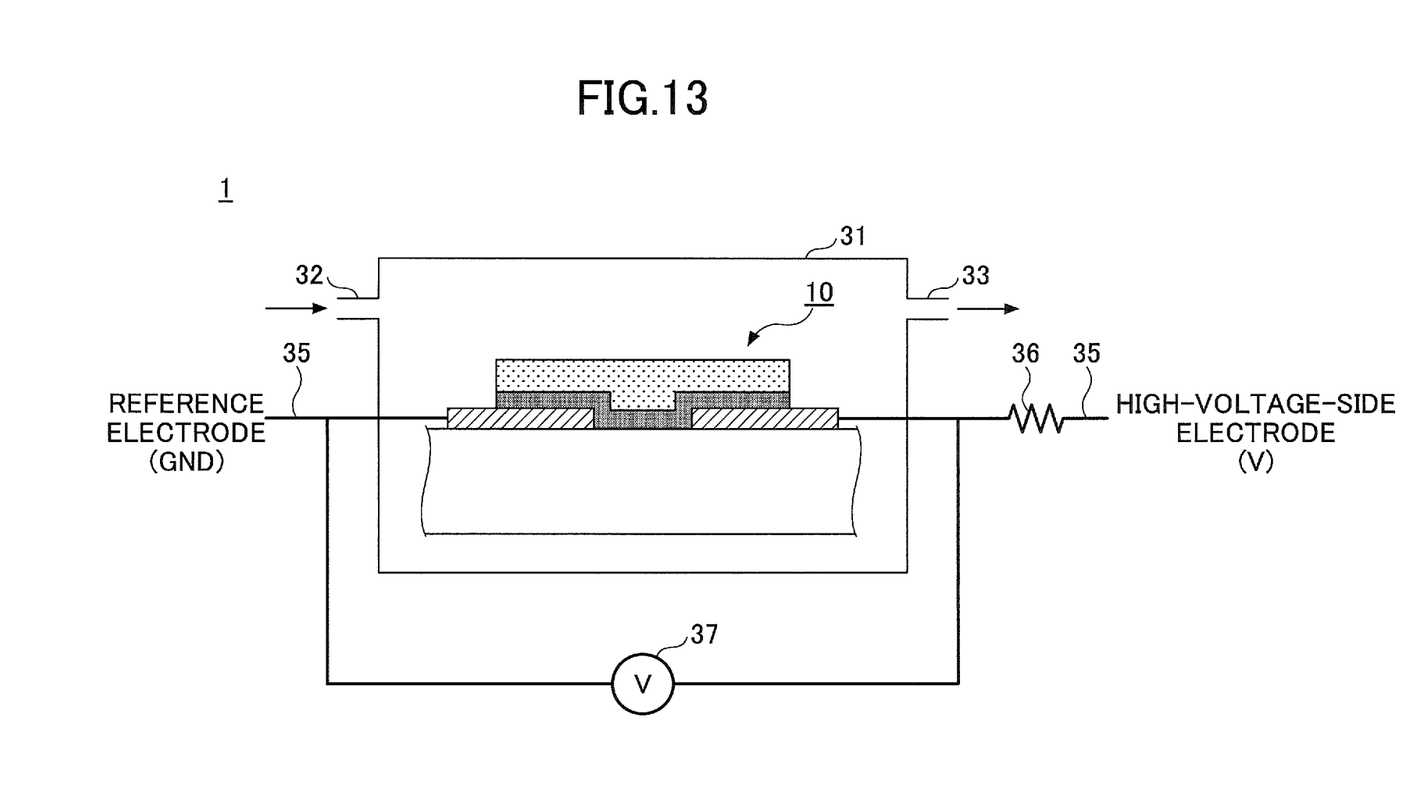
FIG. 13 is a schematic diagram of gas measuring equipment using a gas sensor device according to an embodiment.

FIG. 13 is a schematic diagram of a gas measuring equipment 1 using a gas sensor device 10 (or a gas sensor device 10A) according to an embodiment. The gas measuring equipment 1 has a measuring chamber 31 with a gas inlet port 32 and a gas outlet port 33, and the gas sensor device 10 (or 10A) placed in the measuring chamber 31. Leads 35 are connected to the electrode films 143 of the gas sensor device 10 (or 10A). One of the leads 35 is connected to the reference electrode (GND) and the other is connected via a fixed resistor 36 to the high-voltage-side electrode (V). By measuring the potential difference between the pair of electrode films 13, a change in resistance of the sensing film 17 is measured. A potentiometer 37 may be used as a resistance measuring device. The observed potential difference indicates a resistance change of the sensing film 17. When gas molecules binding to cations are adsorbed onto the surface of the sensing film 17 of CuBr which is a p-type semiconductor, the copper (Cu) ions and the gas molecules are reversibly bonded, and carriers (holes) of the sensing film 17 decrease by the application of electrons from the gas molecules. Consequently, electric resistance rises. The concentration of the target gas can be calculated from the change in electric resistance.

The gas measuring equipment 1 can be applied to, for example, an exhalation sensor for measuring the concentration of ammonia contained in exhaled breath. When ammonia molecules are adsorbed onto the surface of the CuBr sensing film 17, the copper (Cu) ions and the ammonia molecules reversibly combine to reduce carriers (holes) of the sensing film 17. This results in the increased electric resistance.

Because the gas measuring equipment 1 has the sensing film 17 with (111)-oriented CuBr crystal planes dominant at the interface with the air, the response speed is fast and measurements can be obtained in a short time. Moreover, the gas selection ratio of ammonia to hydrogen sulfide is about twice that of the conventional configuration. Ammonia gas can be sensed selectively in preference to other gas species.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it should be understood that the various changes, substitutions, and alterations could be made hereto without departing from the spirit and scope of the invention.

What is claimed is:

1. A gas sensor device comprising:
   a crystalline film of copper(I) bromide, wherein a crystal surface of the copper(I) bromide is formed of a stepped terrace having a flat face and a steep slope;
   a substrate over which the crystalline film of the copper(I) bromide is provided; and
   a layer containing copper oxide and positioned between the substrate and the crystalline film of the copper(I) bromide.

2. The gas sensor device as claimed in claim 1, further comprising:
   a pair of electrode films formed over the substrate,
   wherein the crystalline film of the copper(I) bromide overlaps the electrode films, and the layer containing copper oxide is positioned between the crystalline film of copper(I) bromide and the electrode films.

3. A gas sensor device comprising:
   a crystalline film of copper(I) bromide, wherein a crystal surface of the copper(I) bromide is formed of a stepped terrace having a flat face and a steep slope;
   an electrode partially covered by the crystalline film of copper(I) bromide; and
   a layer containing copper oxide and positioned between the electrode and the crystalline film of the copper(I) bromide.

4. The gas sensor device as claimed in claim 1, wherein the layer containing copper oxide contains copper(I) oxide and copper(II) oxide.

5. The gas sensor device as claimed in claim 4, wherein the layer containing copper oxide contains the copper(II) oxide as a main part and has the copper(I) oxide in the vicinity of a top surface of the layer.

6. The gas sensor device as claimed in claim 3, wherein the layer containing copper oxide contains copper(I) oxide and copper(II) oxide.

7. The gas sensor device as claimed in claim 6, wherein the layer containing copper oxide contains the copper(II) oxide as a main part and has the copper(I) oxide in the vicinity of a top surface of the layer.

8. The gas sensor device as claimed in claim 1, wherein the crystal surface of the copper(I) bromide has a (111) plane as a dominant crystal plane.

9. The gas sensor device as claimed in claim 1 wherein the stepped terrace has two or more flat faces, and a dihedral angle between two of the flat faces is at 71 degrees.

10. The gas sensor device as claimed in claim 1, wherein a selectivity ratio of the crystalline film of copper(I) bromide with respect to hydrogen sulfide gas to ammonia gas is one to twenty.

11. The gas sensor device as claimed in claim 1, wherein a dimension across the flat face of the stepped terrace ranges from 100 nm to 1000 nm.

12. A gas measuring equipment comprising:
    a measuring chamber;
    a gas sensor device provided in the measuring chamber, the gas sensor device having a crystalline film of copper(I) bromide; and
    a resistance measuring device connected to the gas sensor device,
    wherein a crystal surface of the copper(I) bromide is formed of a stepped terrace having a flat face and a steep slope, and
    wherein the gas sensor device further has a substrate over which the crystalline film of the copper(I) bromide is provided, and a layer containing copper oxide and positioned between the substrate and the crystalline film of the copper(I) bromide.

* * * * *